Oct. 21, 1958 G. A. LYON 2,857,024
AIR CIRCULATION WHEEL STRUCTURE
Filed March 25, 1955 4 Sheets-Sheet 4
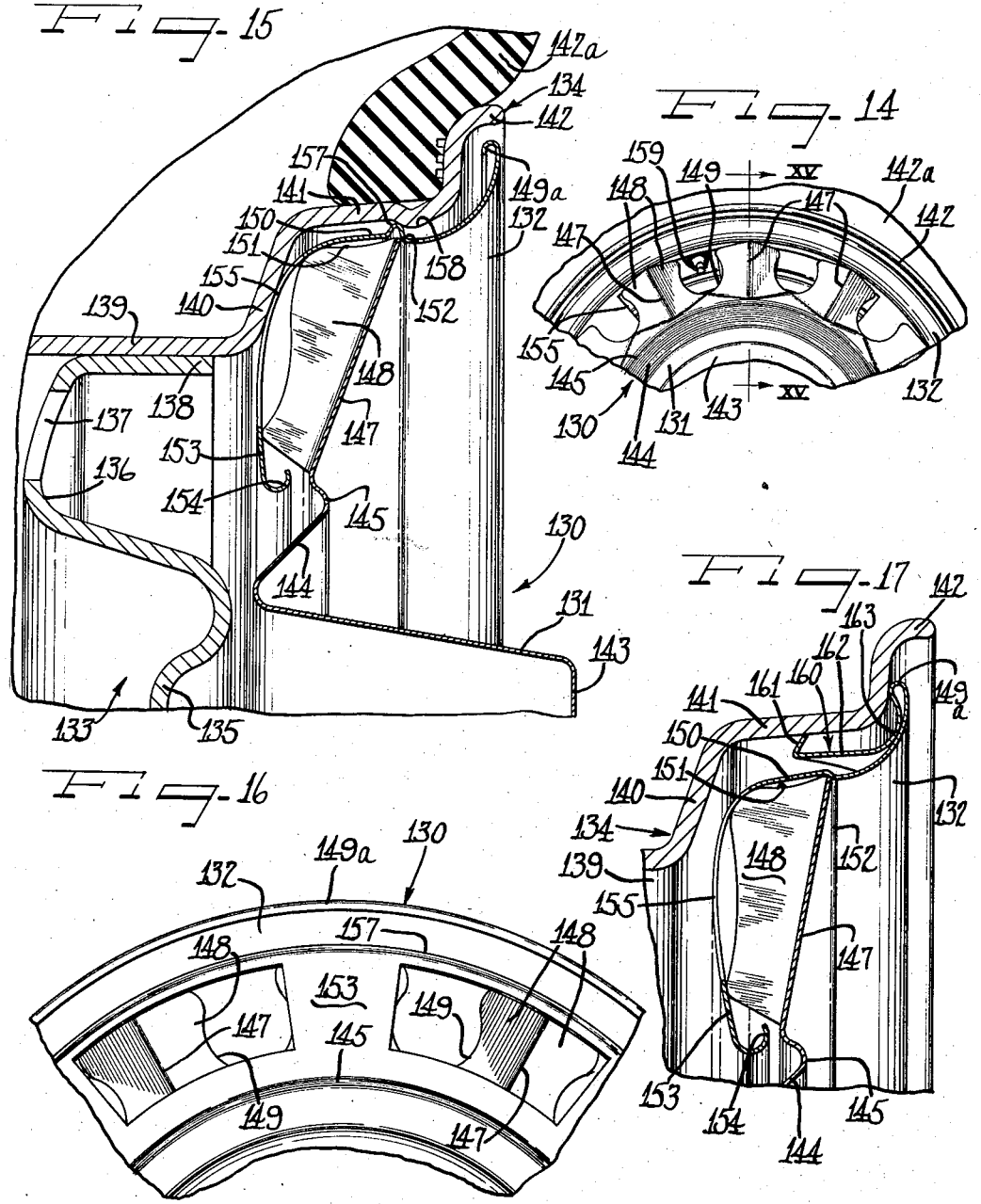
Inventor
George Albert Lyon

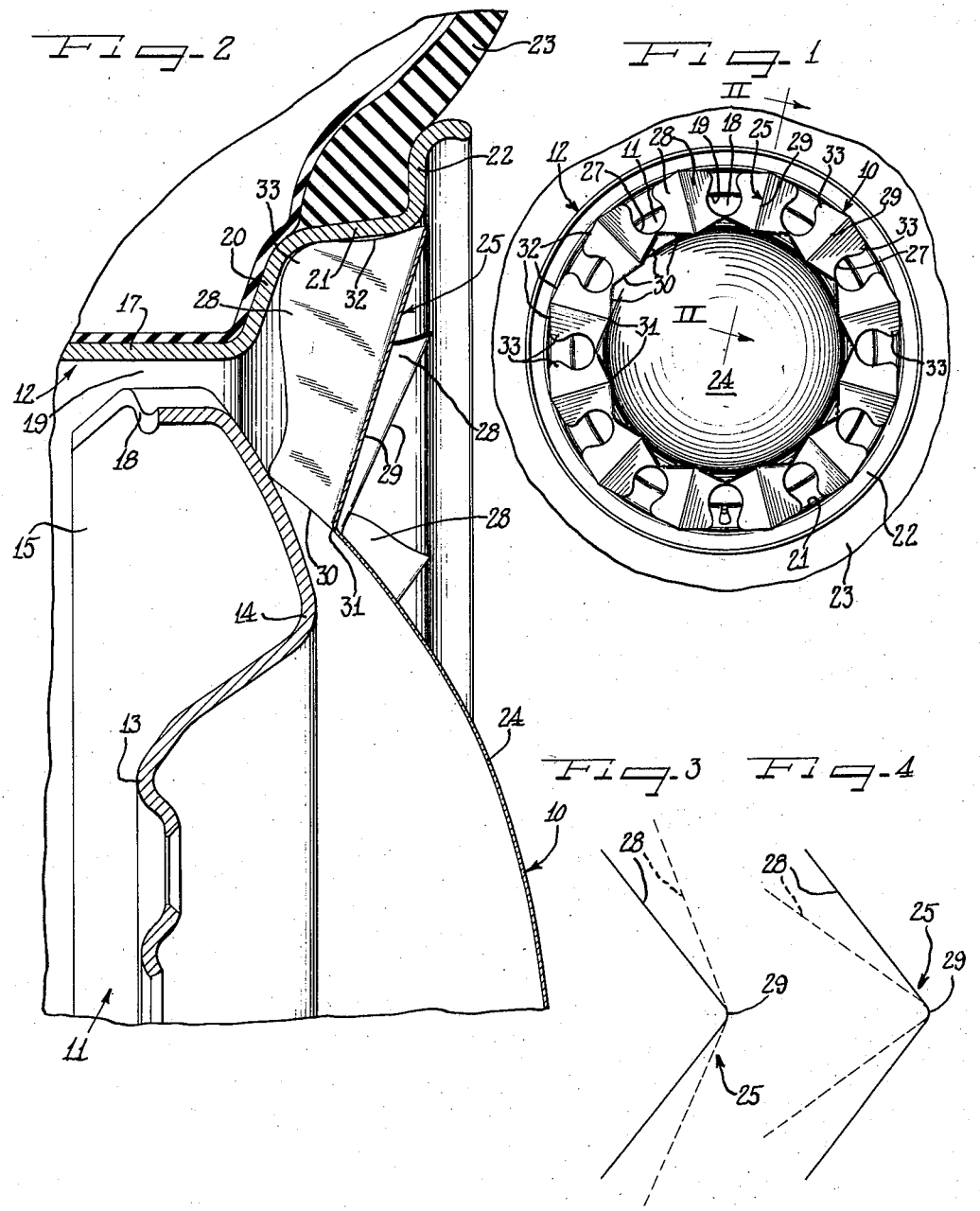

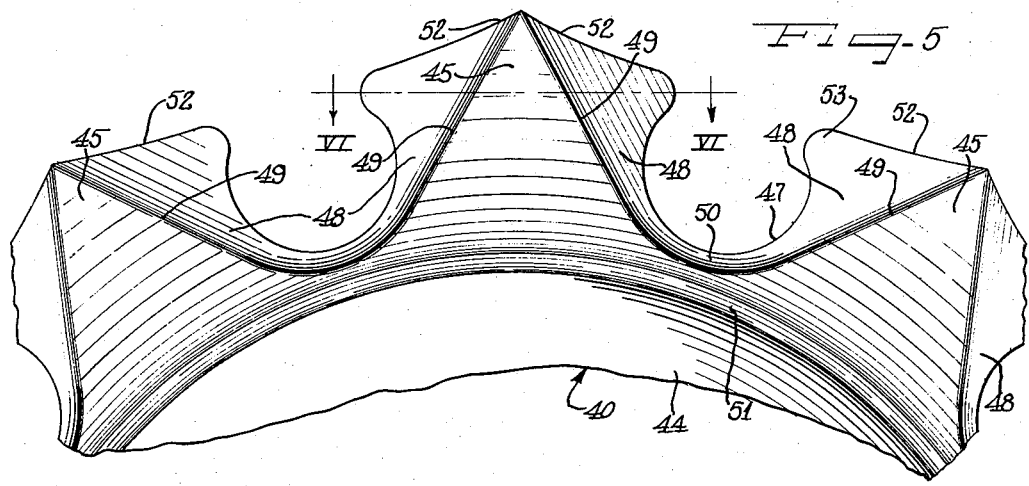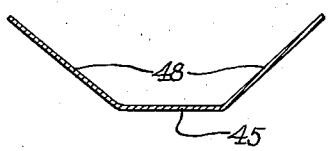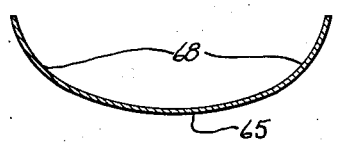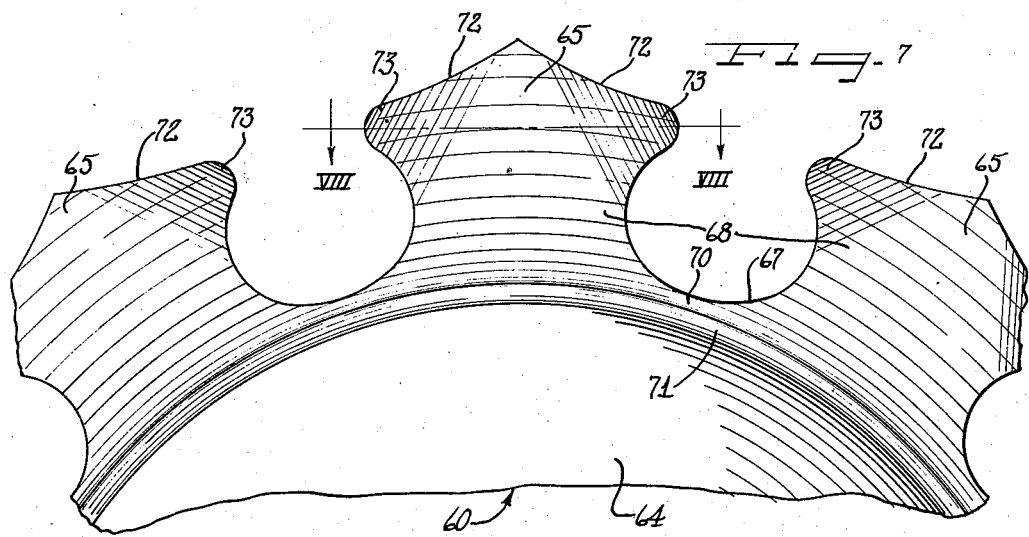

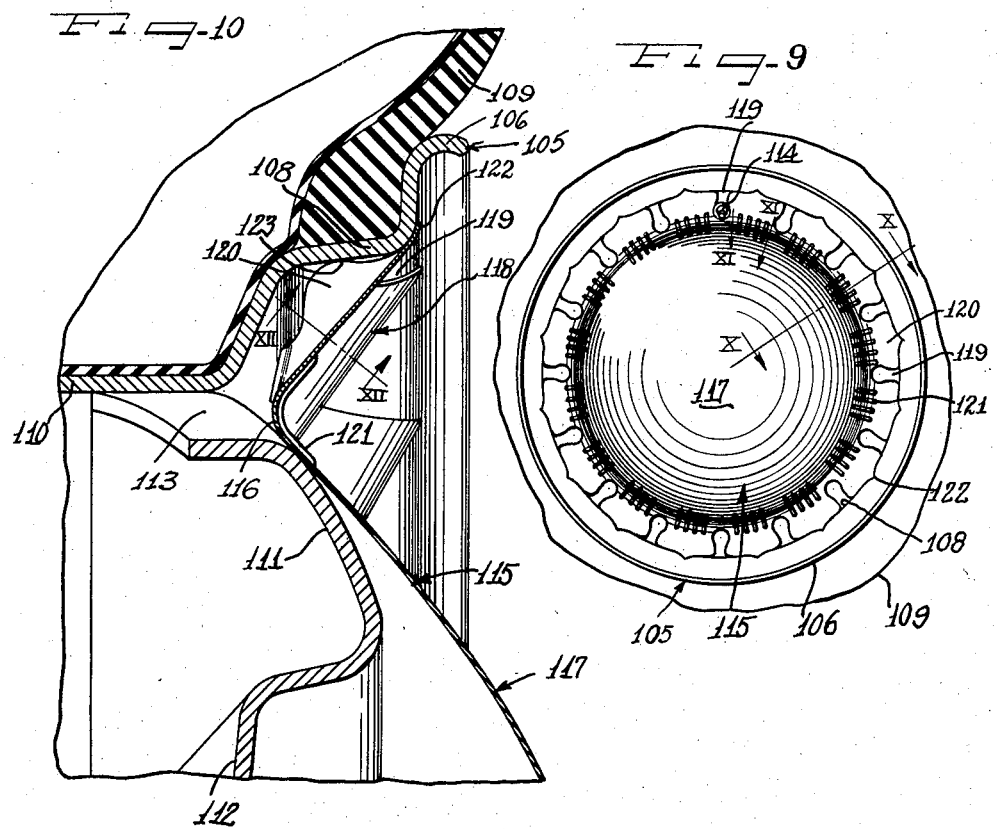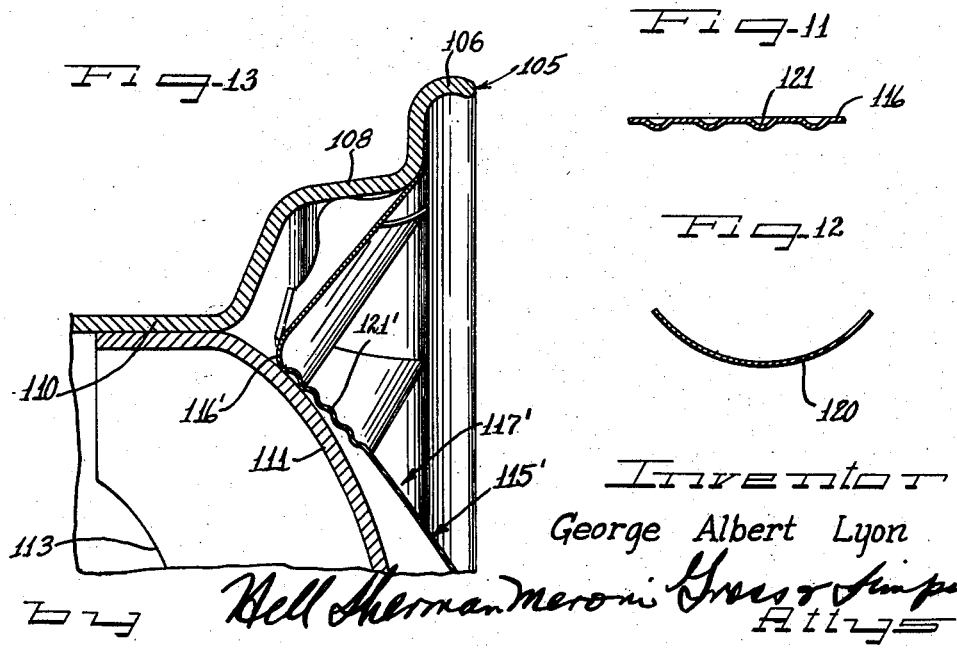

2,857,024
AIR CIRCULATION WHEEL STRUCTURE

George Albert Lyon, Detroit, Mich.

Application March 25, 1955, Serial No. 496,884

14 Claims. (Cl. 188—264)

The present invention relates to improvements in wheel structures and more particularly concerns the ornamental and protective covering of vehicle wheels in a manner to promote air circulation therethrough.

The present application is a continuation-in-part of my copending applications Serial No. 292,159, filed June 6, 1952, and Serial No. 303,494, filed August 9, 1952, both abandoned.

An important object of the present invention is to provide a wheel structure having an improved ornamental and protective cover for the outer side thereof provided with self-retaining means serving also as air circulation promoting structure.

Another object of the invention is to provide a vehicle wheel having on the outer side thereof an improved cover which engages retainingly with the tire rim and has means in association with the retaining means for enabling efficient circulation of air through the wheel and the cover for cooling the brake drum associated with a vehicle axle to which a wheel may be applied.

A further object of the invention is to provide an improved vehicle wheel cover having spoke-like means at the periphery thereof retainingly engageable with a vehicle wheel.

Still another object of the invention is to provide an improved vehicle wheel cover having novel combination cover retaining and air circulation promoting vane structure thereon.

Yet another object of the invention is to provide a wheel cover with separated peripheral segments which in addition to forming ornamental spokes also serve as means for retaining the cover in assembled relation to an automobile wheel.

It is another object of the invention to provide an automobile wheel cover having an ararngement of spokes including means for promoting air circulation through the cover and the wheel and affording a reinforced arrangement wherein the spokes serve as retaining fingers.

A still further object of the invention is to provide a cover wherein the spoke fingers maintain a cover member in assembly with means carried thereby for press-on, pry-off interengagement with a part of a wheel.

Other objects, features and advantages of the present invention will be readily apparent from the following detailed description of certain preferred embodiments thereof taken in conjunction with the accomanying drawings, in which:

Figure 1 is a side elevational view of a vehicle wheel having thereon a cover in accordance with features of the present invention.

Figure 2 is an enlarged fragmentary radial sectional view taken substantially on the line II—II of Figure 1.

Figure 3 is a diagrammatic illustration of the action of the retaining wing elements of the cover during application of the cover to the wheel.

Figure 4 is a diagrammatic illustration of the action of the retaining wing elements during pry-off of the cover.

Figure 5 is a fragmentary plan view of a marginal portion of a modified form of the cover.

Figure 6 is a sectional view taken substantially on the line VI—VI of Fig. 5.

Figure 7 is a fragmentary elevational view of a marginal portion of a further modification.

Figure 8 is a transverse sectional view taken substantially on the line VIII—VIII of Fig. 7.

Figure 9 is an outer side elevational view of a vehicle wheel showing another modification of the cover.

Figure 10 is an enlarged fragmentary radial sectional detail view taken substantially on the line X—X of Fig. 9.

Figure 11 is a fragmentary sectional detail view taken substantially on the line XI—XI of Fig. 9.

Figure 12 is a fragmentary sectional detail view taken substantially on the line XII—XII of Fig. 10.

Figure 13 is a fragmentary radial sectional detail view substantially like Fig. 10 and showing a slight modification of the cover of Fig. 10.

Figure 14 is a fragmentary outer side elevational view of a vehicle wheel showing still another modification of the cover.

Figure 15 is a fragmentary radial sectional view on an enlarged scale taken substantially on the line XV—XV of Fig. 14.

Figure 16 is a fragmentary rear elevational view of the cover of Figs. 14 and 15; and Figure 17 is a fragmentary radial sectional view through a vehicle wheel and cover assembly showing yet another modification.

A cover 10 (Figs. 1 and 2) embodying features of the invention is adapted to be applied to the outer side of a vehicle wheel comprising a wheel body 11 and a tire rim 12. The wheel body may comprise a disk spider stamping made from suitable heavy gauge sheet metal and includes a bolt-on flange 13, an intermediate nose bulge 14 of annular form, and a marginal generally axially inwardly extending attachment flange 15. The attachment flange 15 is secured in appropriate manner to a base flange 17 of the tire rim and at suitable intervals, such as three or four, is inset as indicated at 18 to provide air circulation openings 19 between the wheel body and the tire rim.

At the outer side of the tire rim, a side flange 20 extends generally radially and axially outwardly from the outer margin of the base flange, and merges with an intermediate generally radially and axially outwardly sloping flange 21, in turn merging with a terminal flange 22. The configuration of the tire rim is such as to accommodate a pneumatic tire and tube assembly 23, or a tubeless tire, as may be preferred.

The wheel cover 10 is so constructed and related to the wheel assembly that the cover can be readily applied to the wheel by pressing the cover axially inwardly into position on the wheel; and when it is desired to remove the cover, application of a pry-off tool, such as a screw driver, will accomplish such result. To this end, the cover 10 is preferably constructed from suitable thin gauge sheet metal such as sheet steel, preferably stainless steel, or brass, or the like, and comprises a disk body portion 24 which is preferably bulged outwardly as a crown which will cover the central portion of the wheel including the bolt-on flange 13 and the nose bulge 14. The body portion 24 is preferably of a smaller diameter than the diameter defined by the marginal flange insets 18 of the wheel body.

Projecting generally radially from the margin of the body portion 24 of the cover is a uniform series of cover-retaining spoke-like extensions or fingers 25. These fingers are preferably formed in one piece with the cover body 24 by a suitable stamping method of manufacture.

The retaining fingers 25 are separated by cutouts or notches 27 which, in the aggregate, afford substantial opening through the marginal portion of the cover for air circulation through the cover and through the wheel openings 19 therebehind.

Each of the retaining fingers 25 is constructed and arranged to afford not only means for retaining engagement with the wheel, but also to improve movement or circulation of air through the cover in the operation of the wheel with the cover thereon. For this purpose, each of the retaining fingers 25 is preferably formed of balanced louver shape, comprising a pair of symmetrical generally inwardly divergent wheel gripping and louver vanes or flanges or wings 28. In the form of Figures 1 and 2, the divergent relationship of the wings 28 is attained by centrally longitudinally creasing the respective fingers 25, thereby affording a central longitudinal reinforcing rib 29 which substantially reinforces the finger against transverse bending or collapse under stress. As will be observed from Figure 2, the central reinforcing rib 29 extends on a divergent angle to the margin of the cover body 24 at juncture therewith, and such angle is generally radially and axially outwardly. The length of the finger is such as to extend into overlying relation to the intermediate flange 21 and preferably the adjacent or juncture portion of the terminal flange 22 of the tire rim.

As will be observed from Figure 1, the cutouts or notches 27 are preferably of arcuate form so that the inner end portions of immediately adjacent ones of the retaining finger wing flanges 28 are integrally joined for mutual resilient tensioning and resistance to independent relative flexing or deformation of the inner end portions of the flanges. Such flexure resistance is enhanced by having the inner end portions of the finger flanges flare toward greater width to the adjoining finger flange of the neighbor retaining fingers at each side. Further enhancement of flexure resistance in the inner end portions of the fingers is attained by having the junctures of the finger flanges with the cover body 24 on respective reinforcing ribs 30 which preferably extend from juncture of the longitudinal finger ribs 29 with the cover body toward convergence at the notches 27 medially between the adjacent finger members. Through this arrangement, a certain amount of flexure of the retaining finger members 25 as respective units in axial direction relative to the cover unit is permitted under substantial resilient stress, about a fulcrum point 31 at juncture of the finger ribs 29 in each instance with the cover body 24, and strongly resisted by the inner end juncture portions of the retaining finger flanges 28.

For retaining engagement with the wheel, each of the retaining finger flanges 28 is preferably provided with an outer retaining edge 32 for gripping retaining engagement with the inner face of the intermediate flange 21 of the tire rim. It will be observed that by having the rim flange engaging retaining edges 32 symmetrically formed and uniformly disposed about the periphery of the cover to a proper extent, uniform and balanced radially outward retaining pressure will be exerted by each of the retaining edges 32 against the tire rim flange 21.

In order to assure thorough, uniform gripping engagement of the retaining edges 32 against the tire rim flange in spite of manufacturing tolerances or inaccuracies that may occur either in the tire rim or in the cover structure, and to facilitate application and removal of the cover, the resilience of the outer end portions of the retaining finger flanges 28 is enhanced by providing each of such flanges at its forward end portion with a lateral lobe extension 33 providing a lateral elongation at each side of each of the retaining fingers for the retaining edge 32 in each instance.

In applying the cover 10 to the wheel, the outer side portions of the retaining finger lobes 33 defined by the retaining edges 32 thereon are applied to the outer margin of the intermediate flange 21 of the tire rim at the rounded juncture of the intermediate flange with the terminal flange 22. The diameter to which the lobe end portions of the retaining edges 32 extend in the unstressed condition of the cover is such that after initial contact of the edges with the tire rim there is resistance to further axially inward movement of the cover relative to the wheel. Such resistance demands axially inward force or pressure against the cover to cause the retaining edges 32 of the fingers to cam sidingly inwardly along the inward slope of the intermediate flange 21 of the tire rim. This causes tensioning and lateral spreading of the companion retaining finger flanges 28 as schematically indicated in Figure 3. Thus, the retaining finger flanges 28 will gradually spread from the initial or normal position as indicated in full outline in Figure 3 to a spread apart condition as indicated in dash outline as the application of the cover to the wheel progresses axially inwardly. However, such spreading of the retaining finger flanges encounters substantial resistance due to the longitudinal rigidity in the finger afforded by the longitudinal crest rib 29 and by the mutual resistant juncture of the widened inner ends of the flanges 28 in the set of fingers, so that after the cover has been partially forced home on the wheel, the resistance tensions in the several fingers develop to an extent that forces at least slight yielding at the junctures 31 of the fingers with the cover body and at the juncture ribs 30 of the inner ends of the retaining finger flanges with the cover body, under high resilient tension responsive to the gradually increasing radially inward uniform compression to which the marginal fingers are subjected. Hence, the outer edge portions, including the lobes 33 of the finger flanges 28 gradually draw toward their companion in the second phase of inward movement of the cover into retained position, and this causes the retaining edges 32 to enter into progressively stronger wedging action against the intermediate flange 21 until the cover has been driven all the way home as evidenced, for example, by bottoming of the margin of the cover body at the cutouts 27 against the wheel body 11 adjacent to but spaced radially inwardly from the insets 18. The cover 10 is thereby quite thoroughly retained on the wheel since the retaining edges 32 are wedged tight against the tire rim intermediate flange by the compound resilient stresses developed in the retaining fingers and working toward the retaining edges 32.

In the fully assembled relationship of the cover 10 to the wheel, the outer ends of the retaining fingers 25 preferably project axially outwardly sufficiently beyond the tire rim terminal flange 22 adjacent to juncture thereof with the intermediate flange 21 to provide a small gap as seen in Figure 2, into which the end of a pry-off tool such as a screw driver can be inserted for exerting pry-off leverage force generally axially outwardly against the underside of the outer end portion of the finger for drawing the finger axially outwardly along the tire rim intermediate flange to loosen the finger for dislodging the cover. As the finger is levered outwardly at its outer end, it will be appreciated that the adjacent fingers 25 are still in retaining gripping engagement with the tire rim and will resists such outward movement of the levered finger. Consequently, the levered finger will be forced to yield axially outwardly about the fulcrum 31. As a result, substantial additional resilient stresses are created in the side flanges 28 of the fingers by reason of their joined relationship to the flanges of adjacent fingers at their inner ends, so that the flanges 28 tend to draw laterally toward one another as indicated schematically in Figure 4, from the full line normal tire rim gripping relationship to the dash outline relationship. This, of course, increases the radially outward thrust of the retaining edges 32 of the levered finger 25 against the tire rim flange 21 and this tends to slightly shift the cover 10 responsively radially away from the levered finger and tends to slightly loosen the immediately adjacent retaining fingers relative to the tire rim flange. Thereafter, progressive application of pry-off force to the adjacent retaining fingers 25 progressively around the cover from the initially pried finger gradually effects loosening of the grip of the pried fingers until the cover is dislodged.

In the modification of Figures 5 and 6, a cover 40 having a cover body 44 is provided at its outer periphery with generally radially and axially outwardly extending retaining finger extensions 45. Arcuate cutouts or notches 47 separate the adjacent fingers. Each of the fingers 45 is provided with generally inwardly divergently related side wing flanges 48 which in this instance are joined to the body of the finger 45 on respective juncture ribs 49 which converge toward the point of the finger and are continuous with the juncture ribs 49 of the immediately adjacent fingers, as shown in Figure 5. The side wing flanges 48 are joined by integral flanges 50 defining the inner arcuate portions of the cutouts 47.

The fingers 45 are joined to the body portion 44 on a common circular juncture 51 providing a cover reinforcing rib and a flexure fulcrum for the respective retaining fingers.

Each of the retaining finger side flanges 48 has an inwardly slanting radially outwardly extending retaining edge 52 which is continuous from the point or tip of the finger throughout a side lobe 53 at the forward end portion of the flange.

It will be appreciated that operation of the retaining fingers 45 and more particularly the side flanges 48 thereof in the application and retention of the cover and in pry-off removal of the cover is substantially the same as described in connection with the cover 10. By reason of the substantial width of the inner end portions of the fingers 45, the continuous joining of all of the fingers together adjacent juncture of the same with the cover body 44 and inwardly from the notches 47, and the joining of adjacent finger side flanges 48 by means of the connecting flanges 50, a high degree of resiliency and tension in service is attained with the finger structures 45.

The modification of Figures 7 and 8 is somewhat like that of Figures 5 and 6, except that the retaining fingers are of somewhat different structure. To this end a cover 60 having a circular disk cover body 64 carries radially outwardly extending and generally axially outwardly diverging retaining fingers 65 separated by notches or cutouts 67. Each of the fingers 65 has a pair of oppositely inwardly diverging side wings or flanges 68 joining the body of the finger 65 on a curve or radius. The curved side flanges 68 are joined to the side flanges of immediately adjacent retaining fingers by respective connecting flanges 70. The fingers 65 join the body 64 on a juncture and axial yielding fulcrum rib 71.

Each of the side flanges 68 of the fingers 65 has a radially projecting retaining edge 72 having a lateral extension portion thereof on a lobe 73. Application of the cover 60 to a wheel is accomplished in the same manner as described in connection with the cover 10, as is also removal of the cover.

It will be appreciated that the schematic illustrations of Figures 3 and 4 will apply with equal effect to the covers 40 and 60 of Figures 5 and 7, respectively.

In Figures 9, 10 and 11 is shown a modification which in most respects is similar to the hereinbefore described modification of Figures 7 and 8, but with the addition of reinforcing means at juncture of the retaining fingers with the body of the cover to enhance the resilient tension and cover-retaining function of the fingers.

As shown in Figures 9 and 10, a tire rim 105 of the multi-flange, drop center type has a terminal flange 106 and an intermediate flange 108 and is arranged to support a pneumatic tire and tube assembly 109, or a tubeless tire, as preferred. A base flange 110 of the tire rim is suitably attached to a disk spider wheel body 111 of substantially similar construction as the wheel body in Figure 11, provided with a central bolt-on flange 112 and having at juncture with the tire rim a plurality such as three or four air circulation openings 113.

For disposition at the outer side of the wheel a wheel cover 115 is provided which is in the form of a metallic stamping made from suitable sheet material such, for example, as thin stainless steel strip or sheet, brass, or the like, which lends itself to a suitable finish such as a highly polished and lustrous finish.

The cover 115 includes a dished intermediate annular portion 116 defined on its sides by divergent radially inner and outer portions 117 and 118, respectively. The inner portion 117 is preferably bulged outwardly in the form of a crown and is adapted to extend over the center of the wheel, although if it is so desired, it may be furnished with a detachable hub cap (not shown), in a manner known to those familiar with this art.

The radially outer portion 118 is provided with a plurality of generally key-hole shaped slots 119 which are equi-distantly spaced around the peripheral margin of the cover. These slots or notches or slits provide the peripheral margin of the cover with a plurality of separated radially projecting segments 120, each of which is preferably transversely convexly shaped or dished. The segments 120 appear from the outer side of the cover to be spokes when the cover 115 is on the wheel.

Each of the spoke-like segments provides a cover retaining finger and is reinforced by a set of generally radially extending ribs 121 located at the base of the segment and extending through the junction portion 116 of the cover as best seen in Figures 10 and 11.

The outermost extremity of each of the segments 120 is formed into a lip 122 adapted to overlap the shouldered end of the tire rim intermediate flange 108 for the purpose of assisting in preventing cocking of the cover when it is applied to the wheel.

In addition, each of the segments 120 is formed with a rearwardly or inwardly projecting preferably rounded edge 123 for gripping engagement with the surface of the inclined intermediate rim flange 108 to retain the cover on the wheel.

Each of the segments 120, of course, has the longitudinal sides thereof formed to provide vanes that are angled to the surface of the cover and to the circumference of the wheel so as to afford air circulation promoting vanes cooperative with the wheel openings 113 in the rotation of the cover for circulation of air therethrough and through the openings 119 in the peripheral margin of the cover.

It will be noted from Figure 9 that the usual valve stem 114 of the tire and tube assembly 109 can project through one of the slots or peripheral openings 119 in the cover so as to be accessible from the exterior of the cover.

In application of the cover 115 to the wheel it is first placed over the wheel with one of the slots or notches 119 in alignment with the valve stem 114 and the cover is then pressed axially into the wheel. In the course of this application of the cover to the wheel, the lips 122 engage the shoulder of the rim flanges 106 and 108 and the junction portion 116 of the cover may bottom against the body part 111 of the wheel. As noted before, the radial lips 122 in engaging the tire rim serve to prevent cocking of the cover. Also, as the cover is pushed home into the wheel the edges 123 of the spoke segments 120 slide along the surface of the rim flange 108 and are resiliently cammed thereby so that they are in tensioned resilient gripping engagement with the rim flange. Action of the side wings or vanes of the retaining finger spoke elements 120 in applying the cover to the wheel or removing the cover from the wheel will, it will be appreciated, be substantially the same as and have the action described in connection with Figures 3 and 4.

The spoke segments 120 not only serve to provide the cover with a spoked appearance but, in addition, constitute the retaining means for the cover, and also provide air circulation promoting means for the wheel. By providing the radial ribs 121 at the junction portion 116, the spoke, vane, finger segments 120 are reinforced to compensate for any weakness that might be occasioned by the provision of the slots 119.

In Figures 12 and 13 is illustrated a modification 115' adapted to be applied to a wheel which in all essential respects is identical with the wheel of Figure 10 and therefore similar reference numerals have been applied thereto to identify the corresponding parts. In this modification of the invention, the junction portion 116' of the cover 115' leads into a plurality of annular corrugations 121' which are in the crown portion 117' of the cover. Except for the corrugations of the ribs 121', this form of cover is substantially the same as the cover 115.

By reason of the fact that the retaining fingers of the spoke-like peripheral segments of the cover in all forms of the invention in Figures 1 through 13 have retaining edges that engage the intermediate flange of the tire rim in opposite rotary directions, any tendency toward torque displacement of the covers on the wheel in service, in either direction, is effectively resisted.

Where it is preferred to provide auxiliary means for retaining the cover on the wheel but yet to take advavntage of the spoke-like peripheral structure of the cover providing cover for not only appearance purposes but also air circulation function as well as a retaining function the construction as shown in Figures 14, 15 and 16 may be utilized wherein a cover 130 in the present instance in the form of an assembly including an inner or central cover member 131 and an outer annular cover member 132 interconnected as a unitary structure and arranged for disposition at the outer side of a vehicle wheel comprising a wheel body 133 and a tire rim 134.

In the present instance the wheel body 133 is of the disk spider type having a central bolt-on flange 135 and an outer marginal inwardly depressed or dished annular portion 136 provided with a series of air circulation openings 137 in the bottom of the groove defined thereby and defined at the radially outer side by an axially outwardly directed marginal extremity flange 138. The tire rim has a base flange 139 to which the attachment flange 138 of the wheel body is secured in suitable fashion as by riveting or welding as the case may be. Extending generally radially outwardly from the outer side of the base flange 139 and facing generally axially outwardly on the tire rim is a side flange 140 that merges with an intermediate generally axially outwardly extending and radially inwardly facing flange 141 from which extends generally radially outwardly and then axially outwardly a terminal flange 142. The flanges of the tire rim are related to support a tire rim tube assembly or a tubeless tire 142a as may be preferred.

As shown, the central cover members 131 comprises a high crown central portion 143 for overlying the central portion or bolt-on flange 135 of the wheel body and with the side of the crown extending deeply into the wheel to an intermediate annular flange portion 144 that extends generally radially and axially outwardly from merger with the crown portion side wall and joins a generally axially outwardly projecting annular small radius reinforcing rib 145 from which extends a generally radially and outwardly projecting series of spoke-like wing-sided, air circulation promoting and retaining fingers 147 which may be of substantially the preferred structure as selected from any of the forms of the invention hereinbefore described but in this instance are shown as substantially like the finger, spoke extensions in Figures 1 and 2. Thus, each of the finger extensions 147 is provided with divergent respective radially elongated and generally axially inwardly and oppositely circumferentially obliquely angled side wing or vane flanges 148. Substantial notches or cutouts 149 in the present instance of generally arcuate shape between the several finger extensions 147, and more particularly between the adjacent side edges of the wing flanges 148 thereof provide for substantial air circulation openings through the margin of the cover member 131.

For retaining the cover 130 on the wheel, the spoke finger extensions 147 are interengaged with the annular radially outer cover member 132 which in turn engages retainingly with the wheel. To this end, the annular cover member 132 is dimensioned to substantially overlie the outer side of the tire rim 134, with the radially outer marginal extremity of the annular cover member shaped to overlie the terminal flange 142 and the adjacent portion of the intermediate flange 141. At its outer extremity the annular cover member 132 is provided with an underturned reinforcing and finishing bead 149a. From the bead 149a the annular cover member 132 extends generally radially and axially inwardly on a convex curvature to extend around the juncture between the intermediate and terminal tire rim flanges, in spaced relation, to merge with a generally axially inwardly extending annular intermediate body portion 150 which in assembly with the wheel is arranged to be in spaced generally telescoped relation within the intermediate flange 141. Generally radially outwardly facing retaining edges 151 on the retaining finger vanes 148 engage retainingly under radially outwardly thrusting resilient tension against the outer annular cover member intermediate wall portion 150.

A preferably interlocked relationship between the retaining fingers 147 and the cover member 132 is attained by providing an inset, annular, overhanging shoulder 152 in the axially outer portion of the wall portion 150 behind which the tips of the retaining fingers are engageable in the assembled relationship of the cover members. Through this arrangement, assembly of the cover members is effected by relative axial movement thereof to work the outer ends of the retaining fingers into position behind the shoulder 152.

After the retaining fingers are engaged behind the shoulder 152 and with the outer edges 151 in engagement with the intermediate wall portion 150 axially inwardly from the shoulder 152, the axially inwardly facing edges of the vanes 148 engage against a generally radially inwardly extending preferably dished inner annular marginal portion 153 of the outer annular cover member. This portion 153 is of sufficient diameter to underlie the fingers 147 to their radially inner junctures with the inner cover member rib 145, and by preference the inner extremity of the inner portion 153 is turned to provide a reinforcing and finishing bead 154.

Air circulation through the cover assembly is assured by having the inner annular portion 153 of the cover formed with an annular series of air circulation apertures 155 behind the retaining finger vanes 147 and of substantial size so as to afford in the aggregate a substantial passage for air through the cover and through the wheel openings 137. In addition to air passage through the openings 155, air may also pass through the gap between the inner edge bead 154 and the adjacent cover rib 145 and into the space behind the retaining finger vanes 147 and the supporting cover portion 153.

For retaining the cover assembly 130 on the outer side of the wheel, means may be provided on the radially outer cover member 132 for engagement with the tire rim. As shown in Figures 15 and 16, such retaining means may comprise an annular radially outwardly projecting cover retaining rib 157 located immediately axially inwardly adjacent the radially inwardly projecting interlock shoulder 152 and engageable with respective generally radially inwardly projecting and axially inwardly facing cover retaining bumps 158 pressed into the axially outer portion of the intermediate flange 141 adjacent juncture thereof with the terminal flange 142. By having the retaining rib 157 of small size and located in the radially flexibly resilient generally axially extending cover body wall or flange portion 150 of substantial width, radially inward resilient deflection of the rib for snap-on, pry-off coaction with the retaining bumps 158 is facilitated. In addition, the substantial openings 155 in the inner portion of the outer annular cover member, leaving relatively narrow radially extending resilient strips connecting the intermediate cover portion 151 with the inner marginal area of the inner cover portion 153, permit radially inward resilient deflection of the cover portion 150 without undue resistance. Moreover, since the retaining vane fingers 147 are substantially resilient they will yield resiliently in the present of radially inward resilient deflection of the intermedite cover portion 150 to a limited extent during resilient deflection of those portions of the retaining rib 157 which snap over or out of retaining engagement with the retaining bumps 158. It will be understood, of course, that the outside diameter of the retaining rib 157 is somewhat larger than the inside diameter described about the tips of the retaining bumps 158 on the tire rim.

In applying the cover 130 to the outer side of the wheel, a valve stem 159 (Fig. 14) projecting from the side flange 140 is registered through one of the openings 155 to project out between a pair of the spoke fingers 147 into one of the openings 149 between such fingers, and the cover is pressed axially inwardly to snap the retaining shoulder rib 157 behind the retaining bumps 158. Snug resiliently tensioned engagement of the rib 157 with the axially inwardly facing shoulders on the retaining bumps 158 is assured by having the inner portion 153 of the outer cover member disposed to bottom against the side flange 140 resiliently between the apertures 155.

For removing the cover 130 from the wheel, a pry-off tool may be inserted behind the outer margin thereof and levered against the outer marginal bead 149 to effect axially outward displacement of the retaining rib 157 from the retaining bumps 158.

Turning of the cover on the wheel is precluded by engagement of the extreme base portion of the value stem 159 by the respective edges defining the opening 155 through which the value stem projects, should there be any tendency of the cover to turn to any extent in either direction. Of course, turning of the inner cover portion 131 relative to the outer cover portion 132 is precluded by the biting interengagment of the spoke finger vane edges 151 against the cover body flange 150.

An alternate manner of attaching the cover to the outer side of the wheel is shown in Figure 17. In this form retaining bumps on the wheel are not relied upon, but self-retaining means in the form of retaining fingers 160 carried by the outer extremity portion of the outer annular cover member 132 are provided to engage at short and stiff generally axially and radially outwardly oblique retaining terminals 161 with the inner face of the intermediate flange 141 of the tire rim. The retaining fingers have elongated generally axially extending resilient legs 162 extending from an underturned flange 163 joining the cover portion 132 at the underturned outer edge bead 149. In this form, the intermediate generally axially extending cover wall flange portion 150 is of somewhat smaller diameter than in Figure 15 so as to afford clearance between the intermediate flange 141 and the wall portion 150 for radial deflection of the retaining fingers incident to camming the same axially inwardly into retaining engagement with the intermediate flange. Moreover, in this form of the cover the underturned bead 149a engages the terminal flange 142 in the fully assembled relationship of the cover to the wheel instead of having the inner portion 153 of the cover engaging the side flange of the tire rim.

Normally the tips of the retaining finger terminals 161 extend to a greater diameter than at least the intermediate inside diameter of the intermediate flange 141 so that when the cover is pressed axially inwardly into engagement with the wheel the retaining fingers are placed under resilient radially inward flexure affording strong radially outward gripping thrust of the tips of the terminals 161 against the terminal flange. Removal of the cover is easily effected by placing a pry-off tool behind the underturned outer terminal bead 149a and applying axially outward leverage thereagainst to draw the retaining fingers axially outwardly from their engaged relation to the intermediate flange.

In all forms of the cover, application and removal of the cover at will is provided for and when the cover is on a wheel it successfully resists unintentional dislodging forces or stresses.

The large area openings between the retaining fingers in all of the forms of the cover afford efficient circulation of air through the marginal portion of the cover between the retaining fingers in the operation of the associated wheel. The balanced louver shape of the retaining fingers in each form of the cover promotes circulation of air through the cover in the operation of an associated wheel traveling in either rotary direction.

In addition, air circulation is promoted by the generally circumferentially facing disposition of the vane flanges of the spoke fingers. Each of the vane or wing flanges has the broad surfaces facing generally obliquely of a line tangent to the general circumference of the cover where the plane of the wing flange surfaces despectively intersect the general circumference of the cover and as measured in a plane perpendicular to said surfaces respectively and including said lines respectively.

It will be understood that modifications and variations may be effected without departing from the scope of the novel concepts of the present invention.

I claim as my invention:

1. In a vehicle wheel structure including a wheel body and a multi-flange tire rim having base, side and terminal flanges and an intermediate flange between the side and terminal flanges, a cover for the outer side of the wheel comprising a circular cover body including a plurality of generally radially extending spoke-like marginal projections including cover retaining terminal portions wedgingly grippingly engageable with the intermediate flange of the tire rim to hold the cover on the wheel, said projections having air circulation openings therebetween extending radially inwardly from the intermediate flange to the cover body.

2. In a wheel structure including a tire rim having an intermediate flange, a cover for the outer side of the wheel comprising a circular cover body having radially and axially outwardly extending retaining finger members spaced apart peripherally and including divergent generally axially inwardly extending flexible retaining side flanges each having a radially outwardly projecting retaining edge engageable with the intermediate flange, said side flanges and finger members being under resilient tension acting toward the retaining edges to maintain the edges in thorough gripping engagement against the intermediate flange.

3. In a wheel structure including a tire rim having a generally radially inwardly facing flange, a cover for the outer side of the wheel comprising a cover body having a series of radially outwardly extending and axially outwardly angled retaining fingers, said retaining fingers having angularly related side flanges which are flexibly movable toward and away from one another, said fingers being joined to the cover body on a fulcrum, the side flanges of immediately adjacent fingers being joined at their inner end portions, the side flanges having radially outwardly directed edges arranged for gripping engagement with the tire rim flange under resilient stress of said side flanges, the fingers being tensionable at said fulcrum to cause said side flages to draw toward one another by reason of counter-tension developed through the mutual joining of the side flanges of adjacent fingers.

4. In a wheel structure including a tire rim having a generally radially inwardly facing and outwardly angled flange, a cover for the outer side of the wheel comprising a cover body having a uniform series of radially outwardly projecting retaining fingers angled generally axially outwardly and having side wing retaining flanges with edges retainingly engageable with said tire rim flange, said side wing flanges of adjacent fingers being joined at their radially inner end portions on a continuous juncture edge and the fingers being joined to the cover for angular cocking and tensioning when the cover is on the wheel, said wing flanges being movable apart and then drawing toward one another in the application of the cover to the wheel, and drawing toward one another to a greater extent on application of a pry-off force to the outer ends of the fingers to tilt the fingers away from the wheel.

5. In a wheel cover, a cover body, finger extensions on said cover body, said finger extensions having side flanges in divergent relation, said side flanges having generally axially extending and radially facing retaining edges adapted for engagement with a vehicle wheel, said side flanges joining the body portions of the fingers on converging angular ribs.

6. A cover for disposition at the outer side of a vehicle wheel, comprising a cover body having generally radially extending retaining fingers, said retaining fingers having generally divergently related retaining side flanges with generally axially extending and radially facing wheel engaging end edges, said flanges being joined to the cover body on respective juncture ribs extending across the inner ends of the flanges.

7. In a cover for disposition at the outer side of a vehicle wheel, a cover body having a plurality of retaining finger extensions, said finger extensions having generally divergently related resilient side flanges provided with cover retaining generally axially extending and radially facing end edges, the inner end portions of the retaining finger side flanges flaring toward the adjacent finger side flanges and being joined thereto on a continuous flange.

8. In a wheel structure including a tire rim having an intermediate flange and a terminal flange, a cover for the outer side of the wheel comprising a cover body having radially and axially outwardly angled retaining fingers having side flanges retainingly engageable with the intermediate flange, and tip portions on the fingers between said side flanges and spaced from the intermediate flange and engageable by a pry-off tool interposed between the tire rim and said tip portions.

9. In a wheel structure including a tire rim having an intermediate flange, a cover for the outer side of the wheel comprising a cover body having generally radially outwardly extending finger extensions, said finger extensions having angularly related retaining wings with end edges extending generally axially and facing generally radially outwardly and retainingly engageable with the intermediate flange and angled in respectively opposite directions with respect to the rotation of the wheel to hold the cover against torque displacement relative to the wheel.

10. In a wheel structure including a generally axially extending and radially facing annular flange, a cover for disposition at the outer side of the wheel and including a cover body having peripherally projecting retaining finger extensions each of which is provided with a pair of generally axially inwardly and radially extending retaining wing flanges and is spaced apart circumferentially of the cover, each of said wing flanges having surfaces disposed to face generally obliquely of a line tangent to the general circumference of the cover where the plane of said surfaces respectively intersect the general circumference of the cover and as measured in a plane perpendicular to said surfaces respectively and including said lines respectively, and being resiliently flexible and having generally radially facing end edges engageable in radially thrusting resiliently tensioned cover-retaining gripping relation against the wheel flange by pressing the cover axially inwardly into position on the wheel, and said edges being releasable from said retaining engagement with the wheel flange in response to axially outward pry-off force to cause the edges to slide axially outwardly along said wheel flange.

11. In a wheel structure including an annular generally radially facing portion, a cover member for the outer side of the wheel including a cover body having generally radially extending finger extensions, said finger extensions having angularly related retaining wing flanges with end edges extending generally axially and facing generally radially and retainingly engageable with said annular portion.

12. In a wheel structure including rim and body parts, a cover for the outer side of the wheel including circular radially inner and outer members, one of said members having means thereon for retaining engagement with the wheel, and the other of said members having a series of generally radially extending spoke-like retaining fingers engageable endwise with said one member and being supported thereby by said one member.

13. In a wheel cover for disposition at the outer side of a vehicle wheel, a circular cover member having a plurality of spoke-like extensions provided with divergently related resilient side flanges having generally axially extending and radially facing end edges, and a second cover member having a generally radially facing annular portion with which said end edges are retainingly engageable, one of said cover members having means thereon for retaining engagement with means on the wheel.

14. In a cover for disposition at the outer side of a vehicle wheel, an inner circular cover member having radially outwardly extending spoke-like finger extensions with generally radially elongated resilient divergent side wing flanges defining between adjacent fingers substantial air circulation openings, an annular cover member encircling said circular cover member and having generally axially extending and generally radially extending annular portions, the axially extending portion of said annular member being retainingly engageable by the ends of said wing flanges and the radially extending portion of the annular member underlying said wing flanges and having air circulation openings therein for passage of air therethrough and through the openings between said retaining finger extensions.

References Cited in the file of this patent
UNITED STATES PATENTS

| 1,937,051 | Zerk | Nov. 28, 1933 |
| 2,092,975 | Hunt et al. | Sept. 14, 1937 |
| 2,148,211 | Lyon | Feb. 21, 1939 |
| 2,202,102 | Horn | May 28, 1940 |
| 2,244,014 | Lyon | June 3, 1941 |
| 2,368,228 | Lyon | Jan. 30, 1945 |
| 2,368,230 | Lyon | Jan. 30, 1945 |
| 2,705,172 | Lyon | Mar. 29, 1955 |